Figure 1:
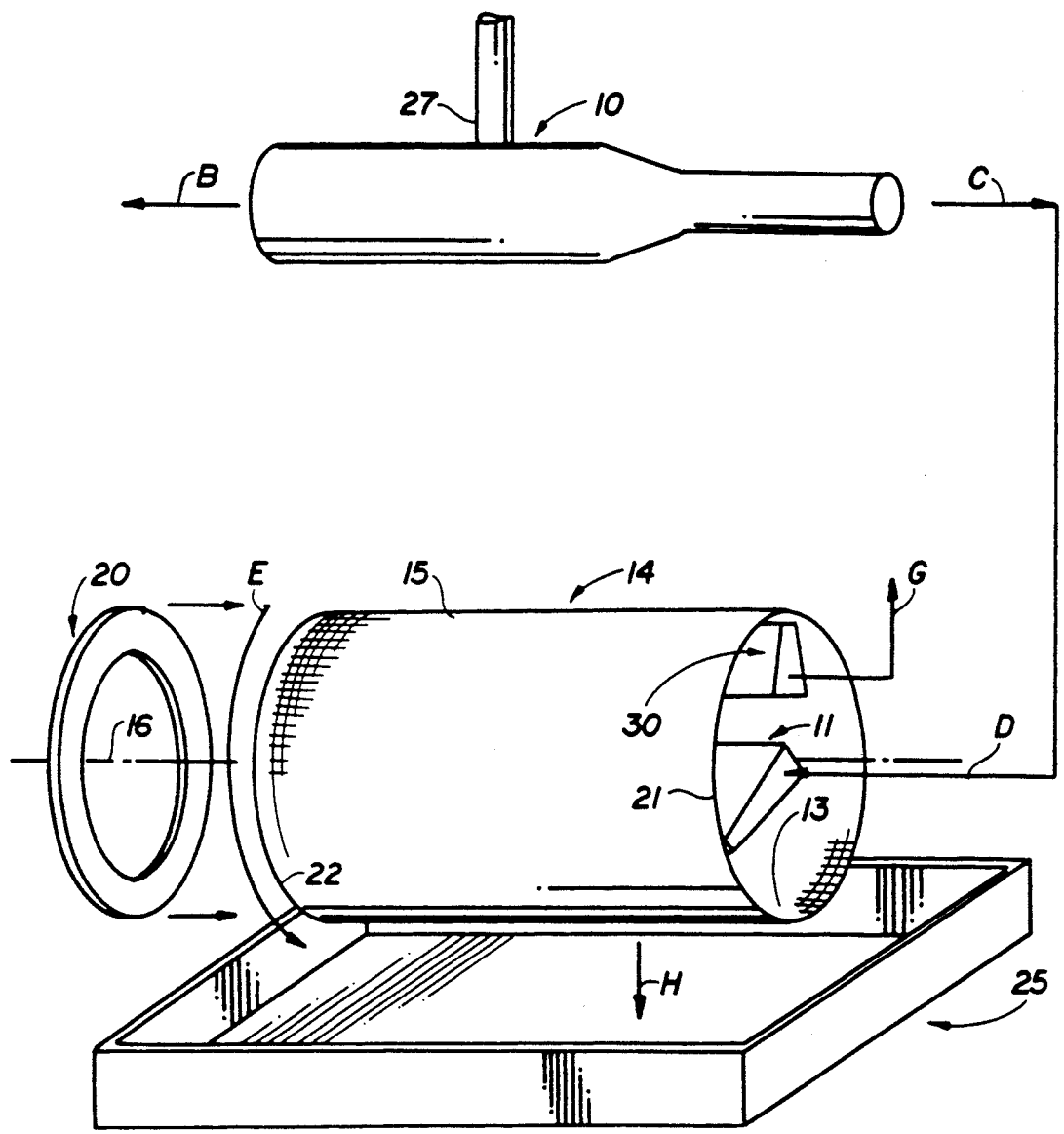

United States Patent [19]
Gurian et al.

[11] Patent Number: 5,178,759
[45] Date of Patent: Jan. 12, 1993

[54] FILTRATION SYSTEM TO REMOVE PHOTORESIST FILM PARTICLES

[76] Inventors: Marshall I. Gurian, 7837 S. Stanley, Tempe, Ariz. 85284; James R. Carter, 1917 E. Apollo, Tempe, Ariz. 85283

[21] Appl. No.: 603,873

[22] Filed: Oct. 23, 1990

[51] Int. Cl.$^5$ .............................................. B01D 33/06
[52] U.S. Cl. ....................... 210/403; 210/394; 210/407; 210/416.1
[58] Field of Search ............... 210/358, 359, 394, 403, 210/407, 416.1, 784, 791, 403, 394, 402; 156/654, 642

[56] References Cited

U.S. PATENT DOCUMENTS

| | | | |
|---|---|---|---|
| 1,453,311 | 5/1923 | Engel, Sr. | 210/394 |
| 2,083,887 | 6/1937 | Wieneke | 210/791 |
| 3,401,654 | 9/1968 | Reichert et al. | 210/784 |
| 4,137,177 | 1/1979 | Shoda | 210/403 |
| 4,236,999 | 2/1980 | Burgess et al. | 210/403 |
| 4,248,709 | 2/1981 | Kruing | 210/403 |
| 4,358,369 | 11/1982 | Matula et al. | 210/512.1 |
| 4,371,422 | 2/1983 | Eidschun | 156/642 |
| 4,692,248 | 9/1987 | Stannard et al. | 210/403 |

Primary Examiner—Mary Lynn Theisen
Assistant Examiner—Sun Uk Kim
Attorney, Agent, or Firm—Tod R. Nissle

[57] ABSTRACT

A method for removing a liquid stripper composition from a slurry comprised of the liquid stripper composition and of photoresist film particles which were removed from a circuit board substrate by using the liquid stripper composition. The slurry flows over the inner surface of the porous wall of a drum under gravity to form a generally uniform layer on the inner surface of the drum. Liquid escapes from the slurry through the porous wall of the drum.

2 Claims, 2 Drawing Sheets

FILTRATION SYSTEM TO REMOVE PHOTORESIST FILM PARTICLES

This invention relates to a method and apparatus for separating the liquid and solid constituents of a slurry.

More particularly, the invention relates to a method for removing a liquid stripper composition from a slurry comprised of the liquid stripper composition and of photoresist film particles which were removed from a circuit board substrate by spraying the liquid stripper composition on the substrate.

In a further respect, the invention relates to a slurry processing apparatus in which liquid is removed from slurry while slurry flows over the inner surface of a drum under gravity and while the slurry forms a generally uniform layer over the inner surface of the drum.

In another respect, the invention relates to a slurry processing method in which the slurry adheres to the inner surface of a rotating drum after liquid is removed from the slurry and in which slurry is removed from the surface of the drum under suction by conveyor without scraping the drum or contacting the drum with a mechanical tool.

During the processing of a circuit board substrate a photoresist film is formed on the substrate. The photoresist film on the substrate is produced by applying a photosensitive film to the substrate and exposing the photosensitive film to light. A common photosensitive film is produced by DuPont and called RISTON. The photoresist film is removed from the substrate using a liquid stripper composition. When the photoresist film is removed, a dilute slurry is formed which is comprised of particles of photoresist film and of the liquid stripper composition. Common liquid stripper compositions are sodium hydroxide and monoethanol amine. The particles of photoresist film in the slurry are commonly called the skins. Being able to separate the liquid from the skins in the slurry is advantageous in recycling the liquid stripper composition and the disposal or recycling of the photoresist film. Separation of the particles of the skins from liquid stripper composition often is not, however, readily accomplished because the suspended skins can assume varying states including finely divided particles in a colloidal suspension and including gel-like particle suspensions. In a typical photoresist slurry produced during the processing of circuit board substrates, the liquid stripper composition often comprises about ninety-eight percent by weight of the slurry, while the skins comprise about two percent by weight of the slurry.

Accordingly, it would be highly desirable to provide a method and apparatus for efficiently separating liquid stripper composition from a slurry which is comprised of the stripper composition and of skins of diverse condition.

Therefore, it is a principal object of the invention to provide an improved method and apparatus for separating liquid from a slurry.

Another object of the invention is to provide an improved method for recovering the liquid stripper composition in a slurry comprised of the liquid stripper composition and particles of photoresist film, the photoresist film being removed from a circuit board substrate by using the liquid stripper composition.

Figure 2:
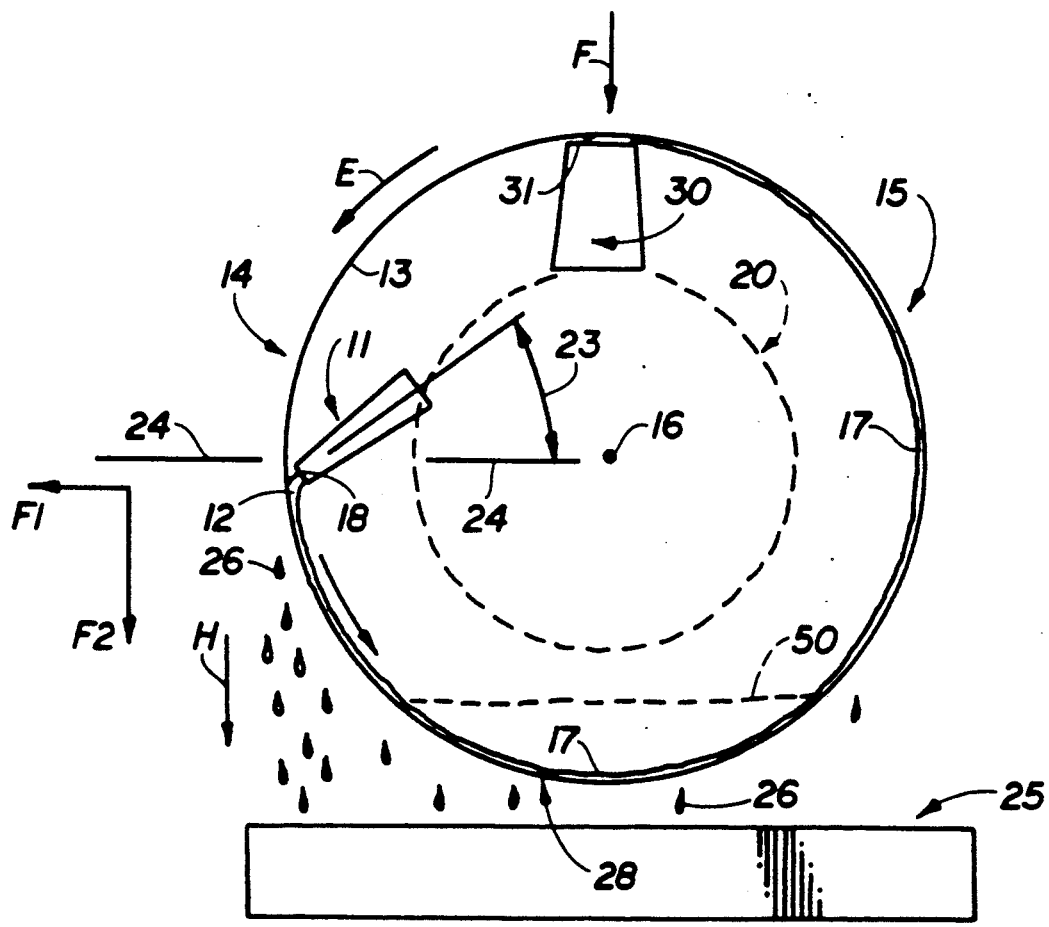

These and other, further and more specific objects and advantages of the invention will be apparent to those skilled in the art from the following detailed description thereof, taken in conjunction with the drawings, in which:

FIG. 1 is a perspective view of apparatus constructed in accordance with the principles of the invention; and, FIG. 2 is an end view of the rotating drum assembly of FIG. 1.

Briefly, in accordance with our invention, we provide apparatus for removing liquid from a slurry comprised of photoresist film particles and a liquid stripper composition. The slurry is produced by utilizing the stripper composition to remove photoresist film from a circuit board substrate. The apparatus includes a porous filtration drum having inner and outer surfaces spaced away from and rotating around a horizontally oriented axis; dispensing means for depositing said slurry of photoresist film particles and liquid stripper composition on the inner surface of said drum such that said slurry flows under gravity downwardly along said inner surface and a portion of said liquid stripper composition separates from said slurry and flows downwardly and outwardly through said filtration drum to produce a partially dried moist photoresist film-particle layer adhering to the inner surface of the filtration drum; and, collection means for inwardly displacing the photoresist-film-particle layer away from the inner wall toward the horizontal axis to separate particles in the layer from the filtration drum, for collecting the displaced photoresist film particles, and for transporting the collected photoresist film particles to a selected storage location.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate slurry processing apparatus constructed in accordance with the principles of the invention. In FIG. 1, a slurry comprised of two percent by weight articles of photoresist film from a circuit board substrate and of ninety-eight percent by weight liquid stripper composition is, as indicated by arrow A, directed through conduit 27 into hydrocylone 10. Hydrocyclone 10 separates liquid stripper composition from the slurry. Liquid stripper composition exits cyclone 10 in the direction of arrow B to be reused in the process of removing photoresist film from circuit board substrates. A slurry comprised of photoresist film particles and the remaining liquid stripper composition exits cyclone 10 in the direction indicated by arrow C. The slurry exiting cyclone 10 in the direction of arrow C is typically about 60 to 90% by weight liquid stripper composition and about 10 to 40% by weight photoresist film particles. The slurry produced by cyclone 10 is, as indicated by arrow D, directed into a spreader apparatus 11 which distributes the slurry 12 onto the cylindrical inner perforate surface 13 of rotating drum 14. Drum 14 includes outer cylindrical perforate surface 15. Surfaces 13 and 15 are concentric and each rotate about a fixed horizontal axis or centerline 16. Drum 14 is permeable by the liquid stripper composition. Hollow drum 14 can, if desired, have a conical, hexagonal, polygonal or other shape which circumscribes and rotates about a horizontally oriented axis 16. As will be appreciated by those of skill in the art, axis 16 need not be perfectly horizontal, but can be canted with respect to the horizontal. Axis 16 can not be perfectly vertical. To achieve a layer 17 of uniform thickness on the inner surface 13 of drum 14, axis 16 is presently preferably horizontal, or within a few degrees of being horizontal.

Means (not shown) are provided for rotating drum 14 around axis 16 in the direction of arrow E. Any desired prior art apparatus for suspending and rotating drum 14 can be utilized. Similarly, means (not shown) is provided for maintaining spreader apparatus 11 in a selected fixed position to dispense slurry 12 onto surface 13 while drum 14 rotates. Slurry 12 can be dispensed from spreader apparatus 11 under pressure or can flow from the mouth 18 of the spreader apparatus 11 under gravity. Drum 14 can be open ended or can be provided at either or both ends with circular collars 20 which partially enclose the inner area circumscribed by cylindrical surface 13. The outer diameter of collars 20 equals the diameter of circular ends 21, 22. The periphery of each collar is attached to an end 21, 22.

Slurry 12 presently preferably contains an amount of liquid sufficient for slurry 12 to initially flow under gravity down surface 13 when slurry 12 is dispensed from mouth 18. As slurry 12 flows down surface 13, liquid stripper composition 26 flows through drum 14, causing the downward flow of slurry 12 to stop so that layer 17 is formed which adheres to and rotates simultaneously with drum 14. The initial flow of slurry 12 down surface 13 at a velocity greater than that of drum 14 facilitates clearance of slurry 12 from mouth 18 and facilitates the formation of a layer 17 of generally uniform thickness on surface 13, and facilitates the removal from the slurry of the majority of the liquid stripper composition which is in the slurry.

The elongate rectangular mouth 18 of spreader apparatus 11 is parallel to axis 16 and extends from one end 21 to the other end 22 of drum 14. Spreader apparatus 11 is canted at an angle 23 with respect to the horizontal line 24 in FIG. 2 to facilitate the uniform spreading of slurry 12 on the surface 13 of drum 14. Orientating the spreader apparatus 11 such that it was horizontal and angle 23 had a value of zero, would, especially when slurry 12 is discharged from mouth 18 under pressure, tend to force film particles into the intersices of the screen comprising drum 14 and to block the interstices. Blockage of the interstices prevents the efficient separation of the liquid stripper composition from the slurry and must be avoided.

After slurry 12 is dispensed from spreader apparatus 11 onto surface 13, liquid stripper composition 26 flows under gravity through openings in the screen comprising cylindrical drum 14 and falls into reservoir 25. The liquid stripper composition can also flow downwardly under gravity along surface 15 to points on the lowermost portion 28 of drum 14. After collecting at the lowermost portion 28 of drum 14, the liquid falls downwardly under gravity into reservoir 25. When liquid stripper composition 24 flows downwardly and outwardly through drum 14, a partially dried, moist layer 17 of photoresist film particles is formed on inner surface 13 of drum 14. As drum 14 continues to rotate in the direction of arrow E, fluid flows under gravity from layer 17 outwardly and downwardly through cylindrical drum 14 into reservoir 25. Slurry 12 is applied at a downward angle to the inner surface 13 of drum 14 at the "9 o'clock" position shown in FIG. 2 to give layer 17 a longer time in contact with surface 13 prior to the displacement of layer 17 inwardly off of surface 13 by suction unit 30 at the "12 o'clock" position shown in FIG. 2.

Slurry 12 presently flows down inner surface 13 from 9 o'clock to about 7 o'clock and forms fixed layer 17 at about 7 o'clock. Most of the stripper composition which separates from the slurry and flows outwardly through drum 14 does so as the slurry flows along inner surface 13 from 9 to 7 o'clock. However, as drum 14 continues to rotate in the direction of arrow E and a portion of layer 17 is carried by drum 14 from 7 o'clock to 3 o'clock, gravity continues to pull small amounts of stripper composition from layer 17. This additional fluid which is pulled from layer 17 flows along three surfaces. One of these three surfaces is the inner surface 13 of drum 14 which is covered by layer 17. Another surface is the outer surface 15 of drum 14. The last of the three surfaces is the outer surface of layer 17. The outer surface of layer 17 faces the interior of drum 14 and is spaced away from inner surface of drum 14. Stripper composition moving along the three afore-mentioned flow surfaces moves downwardly toward the lowermost portion of drum 14 and flows through drum 14 into reservoir 25.

Unit 30 presently removes about 80 to 90% by weight of layer 17 from inner surface 13. Consequently, as drum 14 continues to turn, portions of inner surface 13 which are moving from unit 30 to spreader apparatus 11 have about 10 to 20% by weight of layer 17 remaining on surface 13. An important function of apparatus 11 is to therefore apply slurry 12 to inner surface 13 such that the remaining 10 to 20% of layer 17 which was not removed by unit 30 is "washed" and "cleaned" off of inner surface 13 downwardly along surface 13 from the 9 o'clock position to about the 7 o'clock position. This "washing" function of apparatus 11 is important because it helps prevent photoresist particles which remain on surface 13 after surface 13 moves past unit 30 from blocking perforations in surface 13. In order for slurry 12 to properly perform its "washing" function, it is further important that when apparatus 11 deposits slurry 12 on surface 13 that the outward force component F1 of the slurry against surface 13 be minimal so that slurry 12 does not drive photoresist particles into and block perforations in drum 14. Ideally, force component F1 is small and most of the force or pressure generated by slurry 12 is directly downwardly in the direction of force component F2 in a direction more nearly tangential to the inner surface 13. As earlier noted, canting apparatus 11 in the manner illustrated in FIG. 2 facilitates the deposition of slurry 12 against surface 13 such that the magnitude of force component F2 is greater than the magnitude of force component F1 and/or the magnitude of force component F1 generally is not sufficient to drive photoresist particles into and block perforations in drum 14. Slurry 12 can be applied to inner surface 13 with any apparatus which downwardly "washes" along surface 13 the portion of layer 17 remaining after surface 13 passes unit 30, which does not drive photoresist particles into drum 14, and which causes slurry 12 to downwardly flow over surface 13 from about 9 o'clock to about the 7 o'clock position on drum 14.

Support means (not shown) are provided for maintaining suction unit 30 in fixed position inside drum 14. The mouth 31 of suction unit 30 is similar to the mouth 18 of spreader apparatus 11 in that mouth 31 is rectangular, is parallel to axis 16, and extends from end 21 to end 22 of drum 14. If desired, mouths 18 and 31 need only extend over part of the distance between ends 21 and 22.

A suction force is generated at mouth 31 by using a fan (not shown) or any other desired means to create a force which draws air and layer 17 away from surface 13 into suction unit 30. Alternately, a blower or other means can produce an air stream directed against drum 14 in the direction indicated by arrow F to pass through the screen comprising drum 14 and push layer 17 into unit 30. Photoresist film particles from layer 17 which are displaced inwardly away from surface 13 toward axis 16 are collected by unit 30 and are, as indicated by arrow G in FIG. 1, transported to a selected staging area for packaging or further processing.

Drum 14 can be fabricated from any desired filtration material but is preferably comprised of a wire mesh cloth or other appropriate perforate material. The mesh count of the wire cloth or size and spacing of perforations in drum 14 are selected to permit liquid stripper composition to flow outwardly through drum 14 while preventing the skins from flowing through or blocking perforations in the drum 14.

The use of unit 30 or a comparably functioning unit to remove layer 17 from surface 13 is important in the practice of the invention. Attempting to scrape off layer 17 with a blade or brush which contacts surface 13 of drum 14 forces film particles into the interstices of the screen material comprising drum 14, blocking the interstices. Similarly, the formation of a uniform layer 17 of slurry on the inner surface of screen 13 is important because each time an area of screen makes a complete revolution and return to mouth 18 of spreading apparatus 11, the screen is relatively clean and free of slurry such that when slurry 12 is dispensed from mouth 18 onto surface 13, fluid can readily flow outwardly through the interstices of the screen. Accordingly, simply "dumping" slurry 12 into the bottom of drum 14 to form a reservoir 50 of slurry is inefficient and impedes effective implementation of the invention. The formation of a reservoir 50 of slurry permits photoresist film particles or other types of particles in the slurry to block the interstices of the screen comprising cylinder 14 and, consequently, to block the escape of fluid from the reservoir 50 outwardly and downwardly through the screen into reservoir 25.

Layer 17 must include an amount of residual liquid stripper composition sufficient to enable layer 17 to adhere to inner surface 13 until layer 17 reaches suction unit 30. Suction unit 30 can be located at the "1 o'clock", "3 o'clock" or other positions inside of drum 14, but preferably is positioned between the "11 o'clock" and "1 o'clock" positions to give layer 17 a longer time to dry after slurry 12 is dispensed onto surface 13 by apparatus 11 and to permit the force of gravity better to assist in the removal of layer 17 from surface 13. In FIG. 2, unit 30 is at the "12 o'clock" position.

Having described our invention in such terms as to enable those skilled in the art to understand and practise it, and having identified the presently preferred embodiments thereof, we claim:

1. Apparatus for removing liquid from a slurry including solid particles, said apparatus including
   (a) a hollow porous filtration drum having an inner surface and an outer surface each spaced away from and rotating around a horizontally oriented axis, said drum having at any given instant during the rotation of said drum a lowermost portion spaced below said axis;
   (b) dispensing means positioned inside said drum for depositing the slurry on said inner surface of said drum along a horizontally oriented line spaced upwardly apart from said lowermost portion such that the slurry flows under gravity downwardly from said line along said inner surface toward said lowermost portion and a portion of said liquid separates from the slurry and flows downardly and outwardly through said filtration drum to produce a partially drived moist particle layer of generally uniform thickness adhering to said inner surface of said filtration drum; and,
   (c) collection means for
      (i) inwardly displacing at least some of the particles in said particle layer away from said inner surface downwardly toward said axis to separate particles in said layer from said filtration drum,
      (ii) collecting said displaced particles, and
      (iii) transporting said collected particles to a selected staging area;
   said drum at any given instant during the rotation of said drum having an uppermost portion spaced above said axis; and,
   said layer extending substantially continuously along said inner surface from said line over said lowermost portion and upwardly from said lowermost portion toward said uppermost portion of said drum.

2. The apparatus of claim 1 wherein said collection means includes container means positioned inside said drum and spaced apart from said inner surface to catch and collect said displaced particles.

* * * * *